(12) United States Patent
Chung

(10) Patent No.: US 12,141,693 B2
(45) Date of Patent: Nov. 12, 2024

(54) ELECTRONIC DEVICE AND METHOD FOR GENERATING REFERENCE CONFIGURATION OF COMPUTING DEVICE

(71) Applicant: Wiwynn Corporation, New Taipei (TW)

(72) Inventor: Chang-Han Chung, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 917 days.

(21) Appl. No.: 17/198,260

(22) Filed: Mar. 11, 2021

(65) Prior Publication Data

US 2022/0237449 A1    Jul. 28, 2022

(30) Foreign Application Priority Data

Jan. 22, 2021 (TW) ................... 110102442

(51) Int. Cl.
| | | |
|---|---|---|
| G06N 3/04 | (2023.01) | |
| G06F 18/20 | (2023.01) | |
| G06F 18/2113 | (2023.01) | |
| G06F 18/214 | (2023.01) | |
| G06F 18/23 | (2023.01) | |

(Continued)

(52) U.S. Cl.
CPC ........... *G06N 3/08* (2013.01); *G06F 18/2113* (2023.01); *G06F 18/214* (2023.01); *G06F 18/23* (2023.01); *G06F 18/285* (2023.01); *G06N 3/045* (2023.01)

(58) Field of Classification Search
None
See application file for complete search history.

(56) References Cited

U.S. PATENT DOCUMENTS

| | | |
|---|---|---|
| 10,462,746 B2 | 10/2019 | Yu et al. |
| 10,496,396 B2 | 12/2019 | Garvey et al. |

(Continued)

FOREIGN PATENT DOCUMENTS

| | | |
|---|---|---|
| CN | 103905227 | 7/2014 |
| CN | 105577796 | 5/2016 |

(Continued)

OTHER PUBLICATIONS

Wickramasinghe, Chathurika S., Kasun Amarasinghe, and Milos Manic. "Deep self-organizing maps for unsupervised image classification." IEEE Transactions on Industrial Informatics 15.11 (2019): 5837-5845. (Year: 2019).*

(Continued)

*Primary Examiner* — Hal Schnee
(74) *Attorney, Agent, or Firm* — JCIPRNET

(57) ABSTRACT

An electronic device and a method for generating a reference configuration of a computing device are provided. The method includes: obtaining a first neural network model, wherein the first neural network model includes a plurality of cluster centers, wherein the plurality of cluster centers correspond to a plurality of features; obtaining a first configuration requirement; determining that the first configuration requirement corresponding to a first cluster center among the plurality of cluster centers; generating the reference configuration according to a plurality of first feature values of the first cluster center, wherein the plurality of first feature values correspond to the plurality of features, respectively; and outputting the reference configuration.

18 Claims, 10 Drawing Sheets

(51) Int. Cl.
*G06N 3/045* (2023.01)
*G06N 3/08* (2023.01)

(56) References Cited

U.S. PATENT DOCUMENTS

| | | |
|---|---|---|
| 10,592,230 B2 | 3/2020 | Garvey et al. |
| 10,664,264 B2 | 5/2020 | Garvey et al. |
| 10,917,850 B2 | 2/2021 | Yu et al. |
| 11,023,221 B2 | 6/2021 | Garvey et al. |
| 2012/0053925 A1 | 3/2012 | Geffin et al. |
| 2018/0070314 A1 | 3/2018 | Yu et al. |
| 2019/0102155 A1 | 4/2019 | Garvey et al. |
| 2019/0138290 A1 | 5/2019 | Garvey et al. |
| 2019/0361693 A1 | 11/2019 | Garvey et al. |
| 2020/0053652 A1 | 2/2020 | Yu et al. |
| 2020/0249931 A1 | 8/2020 | Garvey et al. |
| 2021/0133210 A1* | 5/2021 | Kanagovi ............ G06F 16/285 |
| 2021/0286611 A1 | 9/2021 | Garvey et al. |
| 2023/0116148 A1* | 4/2023 | Khacef ................ G06N 3/045 706/15 |

FOREIGN PATENT DOCUMENTS

| | | |
|---|---|---|
| CN | 102959510 | 2/2017 |
| CN | 110806954 | 2/2020 |
| CN | 111316231 | 6/2020 |
| WO | 2016179764 | 11/2016 |

OTHER PUBLICATIONS

"Office Action of Taiwan Counterpart Application", issued on Jan. 18, 2022, p. 1-p. 7.

* cited by examiner

ELECTRONIC DEVICE AND METHOD FOR GENERATING REFERENCE CONFIGURATION OF COMPUTING DEVICE

CROSS-REFERENCE TO RELATED APPLICATION

This application claims the priority benefit of Taiwan application serial no. 110102442, filed on Jan. 22, 2021. The entirety of the above-mentioned patent application is hereby incorporated by reference herein and made a part of this specification.

BACKGROUND

Technical Field

The disclosure relates to an electronic device and a method for generating a reference configuration of a computing device.

Description of Related Art

In order to fairly evaluate computing devices with different configurations (for example, hardware, firmware, or software configurations), manufacturers can usually calculate the scores of the computing devices by test software as references. For example, the manufacturer can use software such as SPECpower_ssj2008 to calculate the scores of the computing devices (for example, the SP value output by the SPECpower_ssj2008 software). In order to use the test software to test the computing devices, the manufacturers need to complete the processes of preparing materials, assembling computing devices, and establishing a test environment (for example, establishing a constant temperature environment) according to customer requirements for the computing devices, which takes a lot of time. When orders for the computing devices increase, manufacturers are often unable to quickly test all the computing devices, which delays the product shipment time.

In addition, different customers care about different functions. Since the test software mainly evaluates the computing power of the computing devices, it is difficult for the manufacturers to evaluate the performance of the computing devices for specific functions through the test results of the test software. For example, if a customer cares more about the storage capacity of the computing device than about the computing power, it is difficult for the manufacturer to find a computing device with better storage capacity based on the test results of the test software.

SUMMARY

The embodiments of the disclosure provide an electronic device and a method for generating a reference configuration of a computing device, which can estimate the score of the device configuration.

An electronic device for generating a reference configuration of a computing device according to an embodiment of the disclosure includes a storage medium and a processor. The storage medium stores a plurality of modules and a first neural network model, wherein the first neural network model includes a plurality of cluster centers, and the plurality of cluster centers correspond to a plurality of features. The processor is coupled to the storage medium and accesses and executes the plurality of modules, wherein the plurality of modules include a data collection module, a computing module, and an output module. The data collection module is configured to obtain a first configuration requirement. The computing module is configured to execute: determining that the first configuration requirement corresponds to a first cluster center among the plurality of cluster centers; and generating the reference configuration according to a plurality of first feature values of the first cluster center, wherein the plurality of first feature values respectively correspond to the plurality of features. The output module is configured to output the reference configuration.

In an embodiment of the disclosure, the data collection module obtains a plurality pieces of label data, and each of the plurality pieces of label data includes a label score and a plurality of label feature values respectively corresponding to the plurality of features, and the plurality of modules further includes a training module. The training module is configured to generate the first neural network model according to the plurality pieces of label data.

In an embodiment of the disclosure, the first configuration requirement includes a first orientation, and each of the plurality pieces of label data further includes a label orientation, and the computing module counts at least one label orientation of at least one piece of label data corresponding to the first cluster center among the plurality pieces of label data to determine a first application orientation corresponding to the first cluster center, and the computing module determines that the first configuration requirement corresponds to the first cluster center in response to the first orientation matching the first application orientation.

In an embodiment of the disclosure, the plurality of cluster centers further include a second cluster center, and the computing module calculates a first score corresponding to the first cluster center and a second score corresponding to the second cluster center according to the plurality pieces of label data in response to both the first cluster center and the second cluster center corresponding to the first application orientation, and the computing module determines that the first configuration requirement corresponds to the first cluster center in response to the first orientation matching the first application orientation and the first score being greater than the second score.

In an embodiment of the disclosure, the plurality pieces of label data include first training data, and the plurality of cluster centers further include a second cluster center and a third cluster center, and the first neural network model includes a first hidden layer, and the first hidden layer updates the plurality of cluster centers according to the plurality pieces of label data, including: defining that the third cluster center is relevant to the second cluster center; generating a plurality of second feature values of the second cluster center and a plurality of third feature values of the third cluster center; and determining that the first training data corresponds to the second cluster center, and updating the plurality of second feature values and the plurality of third feature values according to the first training data in response to the first training data corresponding to the second cluster center.

In an embodiment of the disclosure, the first configuration requirement includes a plurality of feature values respectively corresponding to the plurality of features, and the computing module calculates a plurality of distances between the first configuration requirement and the plurality of cluster centers according to the plurality of feature values and determines that the first configuration requirement corresponds to the first cluster center in response to a first distance corresponding to the first cluster center being a smallest distance among the plurality of distances.

In an embodiment of the disclosure, the plurality of cluster centers further include a second cluster center, and the plurality of distances further include a second distance corresponding to the second cluster center, and the computing module calculates a first score corresponding to the first cluster center and a second score corresponding to the second cluster center according to a plurality pieces of label data respectively corresponding to the first cluster center and the second cluster center in response to the first distance being equal to the second distance, and the computing module determines that the first configuration requirement corresponds to the first cluster center in response to the first score being greater than the second score.

In an embodiment of the disclosure, the plurality pieces of label data include a plurality pieces of training data respectively corresponding to a plurality of label scores, and the first neural network model includes a second hidden layer, and the second hidden layer is configured to execute: generating a distance matrix corresponding to the plurality of cluster centers and the plurality pieces of training data; generating a pseudo inverse matrix of the distance matrix; generating a weight matrix according to the pseudo inverse matrix and the plurality of label scores; generating a second distance matrix corresponding to the plurality of cluster centers and the first configuration requirement; and generating a first score corresponding to the first configuration requirement according to the second distance matrix and the weight matrix, wherein the output module outputs the first score.

In an embodiment of the disclosure, the data collection module obtains a plurality of configuration requirements, wherein the plurality of configuration requirements include the first configuration requirement and a second configuration requirement, and the computing module inputs the plurality of configuration requirements into the first neural network model to generate a plurality of scores respectively corresponding to the plurality of configuration requirements, and the computing module selects the first configuration requirement to generate the reference configuration in response to the first score being a largest score among the plurality of scores, and the computing module generates a difference analysis report according to the first configuration requirement and the second configuration requirement in response to the first score being the largest score and a second score corresponding to the second configuration requirement being a smallest score among the plurality of scores, and the output module outputs the difference analysis report.

In an embodiment of the disclosure, the plurality pieces of label data include a plurality pieces of training data and a plurality pieces of test data, and the training module generates the first neural network model and a second neural network model according to the plurality pieces of training data, wherein the second neural network model includes a plurality of second cluster centers, and a first number of the plurality of cluster centers is different from a second number of the plurality of second cluster centers, and the computing module calculates a first loss function value of the first neural network model and a second loss function value of the second neural network model according to the plurality pieces of test data, and the computing module selects the first neural network model from the first neural network model and the second neural network model to generate the reference configuration in response to the first loss function value being less than the second loss function value.

A method for generating a reference configuration of a computing device according to an embodiment of the disclosure includes: obtaining a first neural network model, wherein the first neural network model includes a plurality of cluster centers, and the plurality of cluster centers correspond to a plurality of features; obtaining a first configuration requirement; determining that the first configuration requirement corresponds to a first cluster center among the plurality of cluster centers; generating the reference configuration according to a plurality of first feature values of the first cluster center, wherein the plurality of first feature values respectively correspond to the plurality of features; and outputting the reference configuration.

In an embodiment of the disclosure, the method further includes: obtaining a plurality pieces of label data, wherein each of the plurality pieces of label data includes a label score and a plurality of label feature values respectively corresponding to the plurality of features; and generating the first neural network model according to the plurality pieces of label data.

In an embodiment of the disclosure, the first configuration requirement includes a first orientation, and each of the plurality pieces of label data further includes a label orientation, and determining that the first configuration requirement corresponds to the first cluster center among the plurality of cluster centers includes: counting at least one label orientation of at least one piece of label data corresponding to the first cluster center among the plurality pieces of label data to determine a first application orientation corresponding to the first cluster center; and determining that the first configuration requirement corresponds to the first cluster center in response to the first orientation matching the first application orientation.

In an embodiment of the disclosure, the plurality of cluster centers further include a second cluster center, and determining that the first configuration requirement corresponds to the first cluster center among the plurality of cluster centers includes: calculating a first score corresponding to the first cluster center and a second score corresponding to the second cluster center according to the plurality pieces of label data in response to both the first cluster center and the second cluster center corresponding to the first application orientation; and determining that the first configuration requirement corresponds to the first cluster center in response to the first orientation matching the first application orientation and the first score being greater than the second score.

In an embodiment of the disclosure, the plurality pieces of label data include first training data, and the plurality of cluster centers further include a second cluster center and a third cluster center, and the first neural network model includes a first hidden layer, and the first hidden layer updates the plurality of cluster centers according to the plurality pieces of label data, including: defining that the third cluster center is relevant to the second cluster center; generating a plurality of second feature values of the second cluster center and a plurality of third feature values of the third cluster center; and determining that the first training data corresponds to the second cluster center, and updating the plurality of second feature values and the plurality of third feature values according to the first training data in response to the first training data corresponding to the second cluster center.

In an embodiment of the disclosure, the first configuration requirement includes a plurality of feature values respectively corresponding to the plurality of features, and determining that the first configuration requirement corresponds to the first cluster center among the plurality of cluster centers includes: calculating a plurality of distances between the first configuration requirement and the plurality of cluster centers according to the plurality of feature values; and determining that the first configuration requirement corresponds to the first cluster center in response to a first distance corresponding to the first cluster center being a smallest distance among the plurality of distances.

In an embodiment of the disclosure, the plurality of cluster centers further include a second cluster center, and the plurality of distances further include a second distance corresponding to the second cluster center, and determining that the first configuration requirement corresponds to the first cluster center among the plurality of cluster centers further includes: calculating a first score corresponding to the first cluster center and a second score corresponding to the second cluster center according to a plurality pieces of label data respectively corresponding to the first cluster center and the second cluster center in response to the first distance being equal to the second distance; and determining that the first configuration requirement corresponds to the first cluster center in response to the first score being greater than the second score.

In an embodiment of the disclosure, the plurality pieces of label data include a plurality pieces of training data respectively corresponding to a plurality of label scores, and the first neural network model includes a second hidden layer, and the second hidden layer is configured to execute: generating a distance matrix corresponding to the plurality of cluster centers and the plurality pieces of training data; generating a pseudo inverse matrix of the distance matrix; generating a weight matrix according to the pseudo inverse matrix and the plurality of label scores; generating a second distance matrix corresponding to the plurality of cluster centers and the first configuration requirement; and generating a first score corresponding to the first configuration requirement according to the second distance matrix and the weight matrix, wherein the method further includes: outputting the first score.

In an embodiment of the disclosure, generating the reference configuration according to the plurality of first feature values of the first cluster center includes: obtaining a plurality of configuration requirements, wherein the plurality of configuration requirements include the first configuration requirement and a second configuration requirement; inputting the plurality of configuration requirements into the first neural network model to generate a plurality of scores respectively corresponding to the plurality of configuration requirements; selecting the first configuration requirement to generate the reference configuration in response to the first score being a largest score among the plurality of scores; and generating a difference analysis report according to the first configuration requirement and the second configuration requirement in response to the first score being the largest score and a second score corresponding to the second configuration requirement being a smallest score among the plurality of scores, and outputting the difference analysis report.

In an embodiment of the disclosure, the plurality pieces of label data include a plurality pieces of training data and a plurality pieces of test data, and generating the reference configuration according to the plurality of first feature values of the first cluster center includes: generating the first neural network model and a second neural network model according to the plurality pieces of training data, wherein the second neural network model includes a plurality of second cluster centers, and a first number of the plurality of cluster centers is different from a second number of the plurality of second cluster centers; calculating a first loss function value of the first neural network model and a second loss function value of the second neural network model according to the plurality pieces of test data; and selecting the first neural network model from the first neural network model and the second neural network model to generate the reference configuration in response to the first loss function value being less than the second loss function value.

Based on the above, the embodiments of the disclosure may train a neural network model for estimating a score of a device configuration based on historical data. Compared with conventional test software, the neural network model of the embodiments of the disclosure may calculate the score of the device configuration in a short time. When the customer's requirements change, the embodiments of the disclosure can estimate the score of the updated computing device without re-executing the test software. In this way, a lot of manpower or resources may be saved. In addition, the disclosure may generate a reference configuration of a computing device focusing on specific functions according to the user requirements.

DESCRIPTION OF THE EMBODIMENTS

Figure 1:
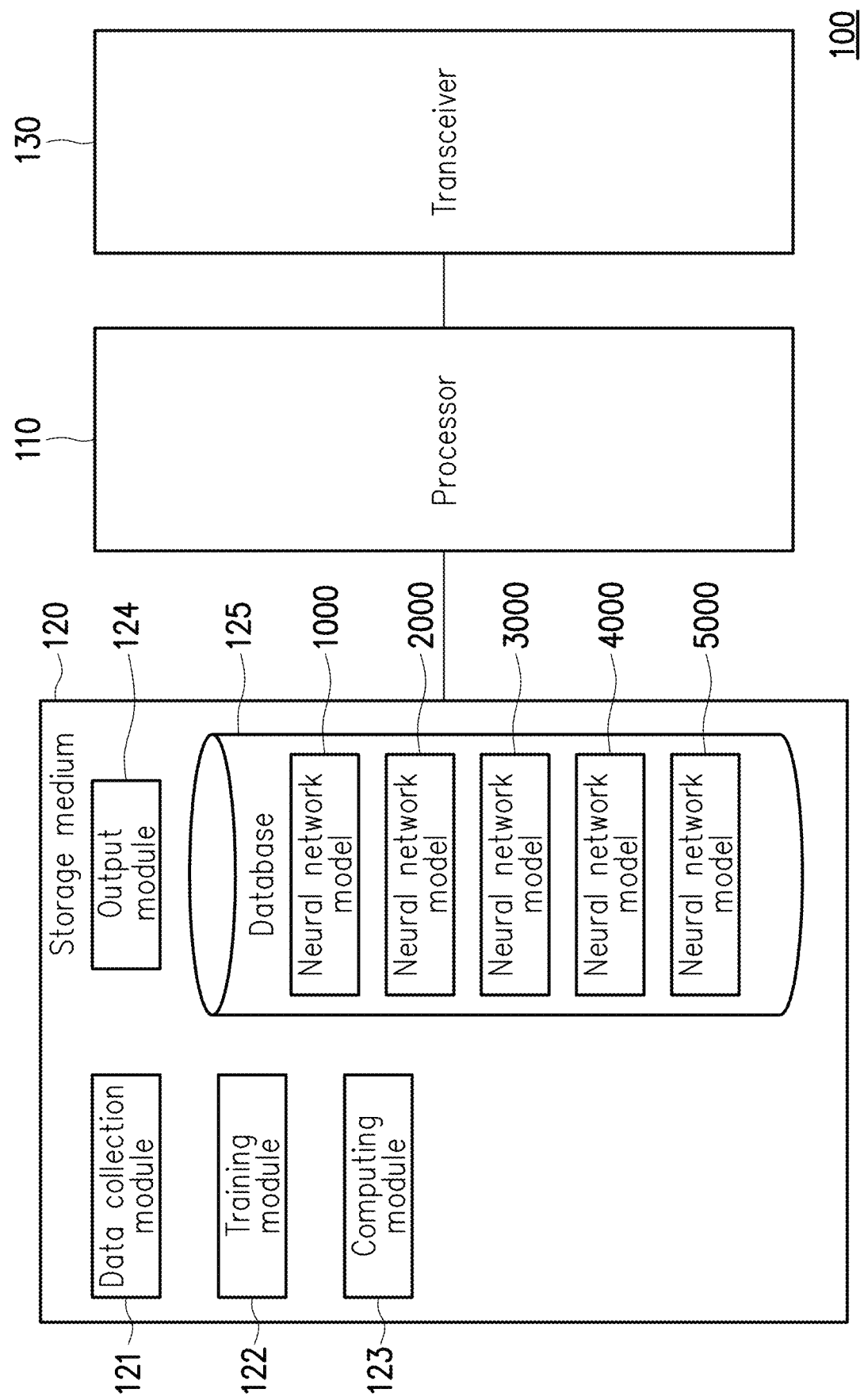
FIG. 1 shows a schematic diagram of an electronic device for generating a reference configuration of a computing device according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

FIG. 1 shows a schematic diagram of an electronic device 100 for generating a reference configuration of a computing device according to an embodiment of the disclosure. The electronic device 100 may include a processor 110, a storage medium 120 and a transceiver 130.

The processor 110 is, for example, a central processing unit (CPU), or a programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA) or other similar components or a combination of the above components. The processor 110 may be coupled to the storage medium 120 and the transceiver 130, and may access and execute a plurality of modules and various application programs stored in the storage medium 120.

The storage medium 120 is, for example, any type of fixed or removable random access memory (RAM), read-only memory (ROM), flash memory, hard disk drive (HDD), solid state drive (SSD) or similar components or a combination of the above components, which are configured to store a plurality of modules or various application programs that can be executed by the processor 110. In the embodiment, the storage medium 120 may store a plurality of modules including a data collection module 121, a training module 122, a computing module 123, an output module 124, and a database 125, the functions of which will be described later.

The transceiver 130 transmits and receives signals in a wireless or wired manner. The transceiver 130 may also execute operations such as low-noise amplification, impedance matching, frequency mixing, up or down frequency conversion, filtering, amplification, and the like. In another embodiment, the transceiver 130 is coupled to an input/output interface circuit (not shown), and the transceiver 130 receives user input data or instructions through the input/output interface circuit, and outputs results through the input/output interface circuit.

The database 125 may pre-store one or more neural network models. For example, the database 125 may pre-store a neural network model 1000. In an embodiment, the database 125 may further pre-store one or more neural network models different from the neural network model 1000, such as neural network models 2000, 3000, 4000, and 5000. The neural network model 1000 may be configured to generate scores of configuration requirements. A user may evaluate the configuration requirements according to the scores output by the neural network model 1000. The configuration requirements may be relevant to a plurality of features such as the hardware configuration, the firmware configuration, or the software configuration. For example, the configuration requirements may include information related to features such as the motherboard model, the central processing unit power, the memory capacity, the solid state drive capacity, the M.2 solid state drive capacity, the hard drive capacity, the FPGA card, the hyper-threading (HT) configuration, the operating system energy configuration or temperature, and the embodiments of the disclosure are not limited thereto.

Figure 2A:
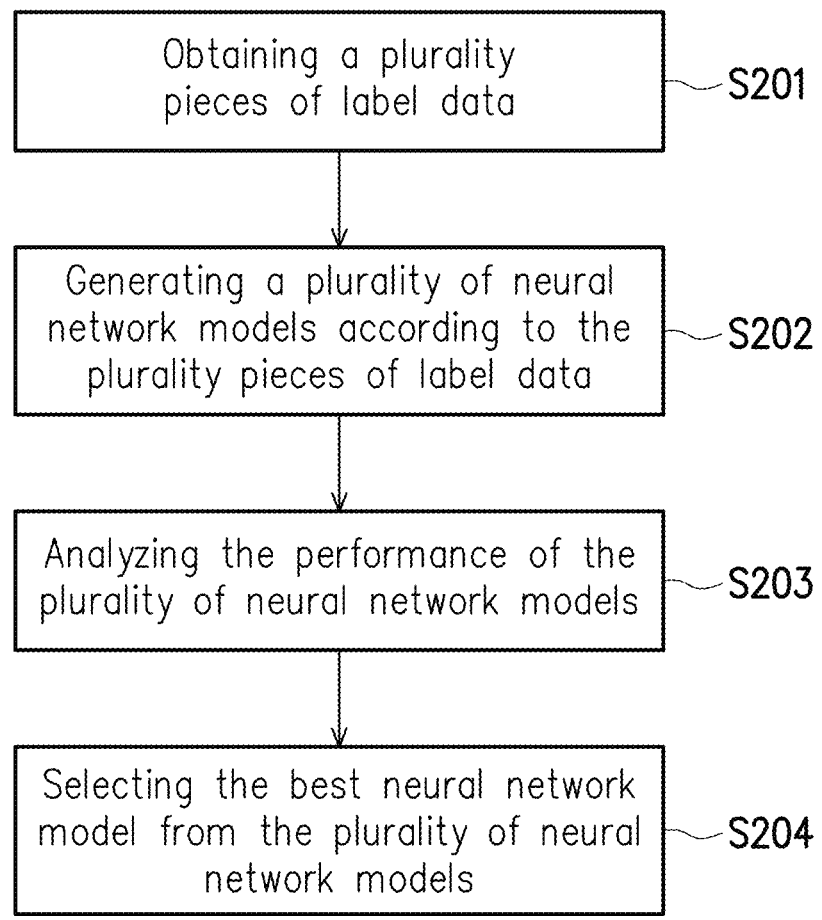
FIG. 2A shows a flowchart of generating the neural network model according to an embodiment of the disclosure.

The neural network model 1000 may be generated by the training module 122. FIG. 2A shows a flowchart of generating the neural network model 1000 according to an embodiment of the disclosure. In step S201, the data collection module 121 may obtain a plurality pieces of label data through the transceiver 130, and each of the plurality pieces of label data may include a label score and a plurality of label feature values respectively corresponding to the plurality of features. The label data may be historical configuration requirements of the labels. Table 1 is an example of a piece of label data. In an embodiment, the label data may further include a label orientation. The label orientation may indicate application scenarios of the configuration requirements corresponding to the label data. For example, the label orientation may indicate that the configuration requirements correspond to products with a high computing performance orientation, products with a high storage capacity orientation, products with an edge device orientation of network architecture, or products with a high energy efficiency orientation. In an embodiment, before using the label data to train the neural network model 1000, the training module 122 may first normalize the plurality of feature values of the label data.

TABLE 1

| Feature number | Label feature value | Unit | Classification | Description |
| --- | --- | --- | --- | --- |
| Feature 1 | 2010 | N/A | Hardware configuration | Motherboard model |
| Feature 2 | 300 | Megabytes | Hardware configuration | Central processing unit power |
| Feature 3 | 384 | Megabytes | Hardware configuration | Memory capacity |
| Feature 4 | 12,000 | Megabytes | Hardware configuration | Solid state drive capacity |
| Feature 5 | 5760 | Megabytes | Hardware configuration | M.2 solid state drive capacity |
| Feature 6 | 144,000 | N/A | Hardware configuration | Hard disk drive capacity |
| Feature 7 | 1 or 0 | N/A | Hardware configuration | FPGA card |
| Feature 8 | 1 or 0 | N/A | Firmware configuration | Hyper-threading (HT) configuration |
| Feature 9 | 1 or 0 | N/A | Software configuration | Operating system energy configuration |
| Feature 10 | 29 | degrees Celsius | N/A | Temperature |

Label score: 3,347
Label orientation: high computing performance orientation

In an embodiment, after obtaining a plurality pieces of label data, the training module 122 may execute a correlation coefficient analysis between each feature and the label score according to the plurality pieces of label data. The training module 122 may delete features that are less relevant to the label score based on the result of the correlation coefficient analysis. Table 2 is an example of the correlation coefficient between each feature of the label data and the label score. For example, a correlation coefficient threshold value may be set for screening. Assuming that the absolute value of the correlation coefficient of 0.7 is the correlation coefficient threshold value, the absolute values of the correlation coefficients between the feature 1 and the feature 2 and the label score are greater than or equal to the correlation coefficient threshold value. Therefore, the training module 122 may determine that the correlation between the feature 1 and the feature 2 and the label score is more significant. Therefore, the training module 122 may retain the feature 1 and the feature 2, and may delete the feature 3 to the feature 10 from the label data. In another embodiment, the correlation coefficient threshold value is set to the absolute value of the correlation coefficient of 0.1, and the absolute values of the correlation coefficients of the features 1 to 9 are greater than or equal to the correlation coefficient threshold value. Therefore, the training module 122 determines to retain the features 1 to 9 and to delete the feature 10 from the label data.

TABLE 2

| Feature number | Description | Correlation coefficient | Retained or deleted |
|---|---|---|---|
| Feature 1 | Motherboard model | −0.86 | Retained |
| Feature 2 | Central processing unit power | 0.70 | Retained |
| Feature 3 | Memory capacity | 0.68 | Deleted |
| Feature 4 | Solid state drive capacity | 0.10 | Deleted |
| Feature 5 | M.2 solid state drive capacity | 0.25 | Deleted |
| Feature 6 | Hard disk drive capacity | 0.19 | Deleted |
| Feature 7 | FPGA card | 0.6 | Deleted |
| Feature 8 | Hyper-threading (HT) configuration | −0.16 | Deleted |
| Feature 9 | Operating system energy configuration | −0.16 | Deleted |
| Feature 10 | Temperature | −0.06 | Deleted |

Figure 3:
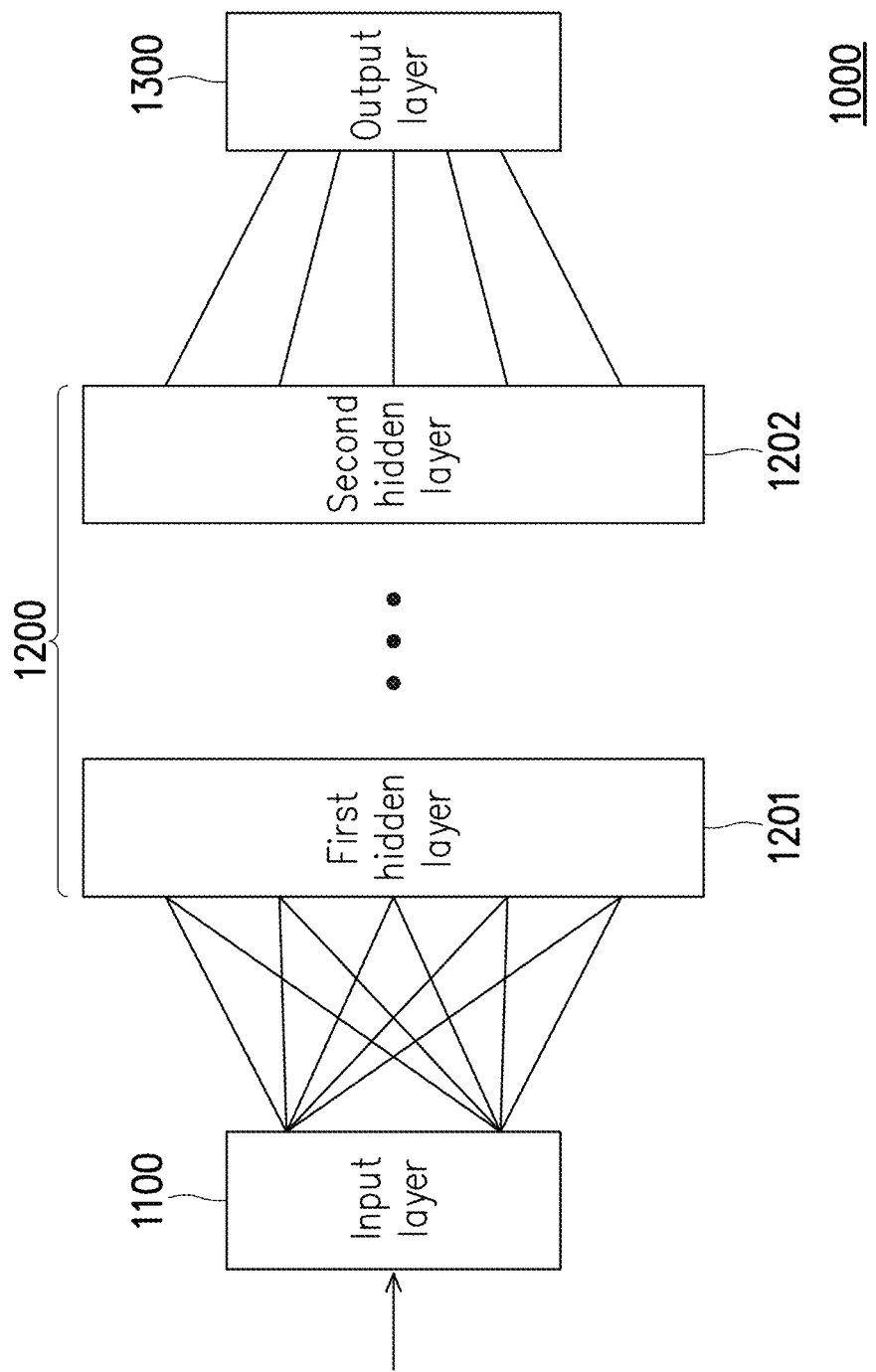
FIG. 3 shows a schematic diagram of the neural network model according to an embodiment of the disclosure.

In step S202, the training module 122 may generate a plurality of neural network models according to the plurality pieces of label data. The number of the plurality of neural network models may be any positive integer. In the embodiment, the plurality of neural network models may include the neural network models 1000, 2000, 3000, 4000, and 5000. FIG. 3 shows a schematic diagram of the neural network model 1000 according to an embodiment of the disclosure. Taking the neural network model 1000 as an example, the neural network model 1000 may include an input layer 1100, hidden layers 1200, and an output layer 1300. The hidden layers 1200 may include a first hidden layer 1201 and a second hidden layer 1202. The input layer 1100 may be configured to receive input data (for example, the configuration requirements), and the output layer 1300 may be configured to generate scores corresponding to the input data.

Figure 4B:
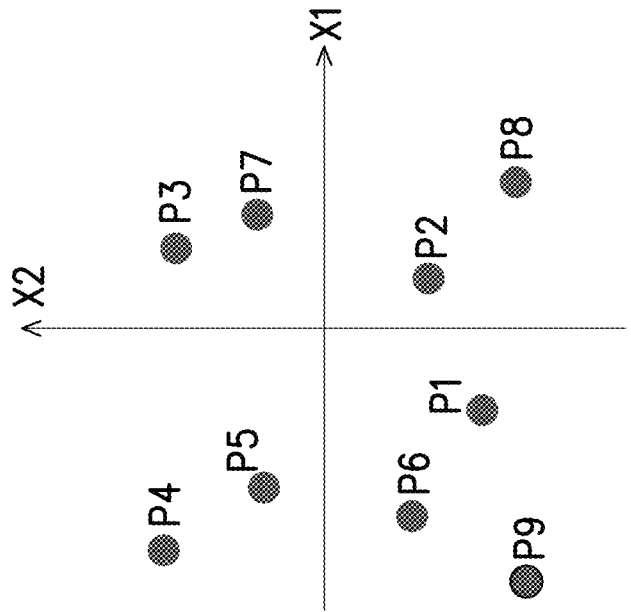
FIGS. 4A, 4B, and 4C show schematic diagrams of generating cluster centers according to an embodiment of the disclosure.
Figure 4A:
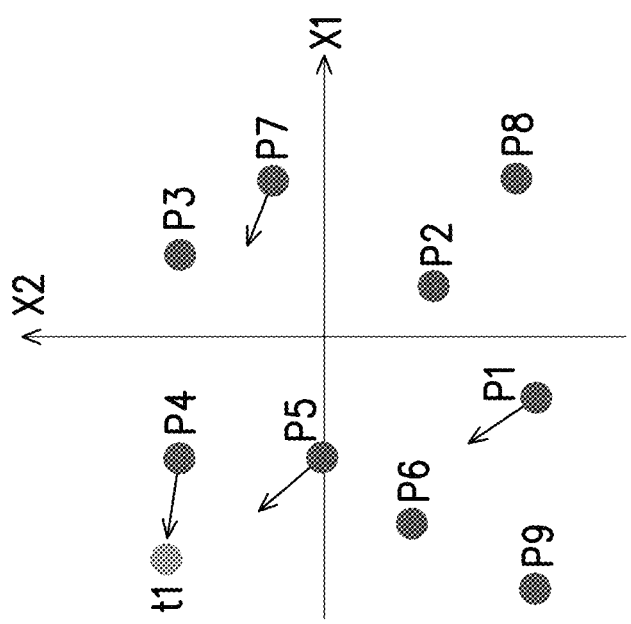

For the training method of the neural network model 1000, please refer to FIGS. 4A to 6A. Specifically, the neural network model 1000 may include a plurality of cluster centers, and each cluster center may correspond to a plurality of features. The number of cluster centers may be preset. For example, the neural network model 1000 may include 9 cluster centers, as shown in FIG. 4A. FIGS. 4A, 4B, and 4C show schematic diagrams of generating cluster centers according to an embodiment of the disclosure. FIG. 4A shows 9 cluster centers of the neural network model 1000, which are cluster centers P1, P2, P3, P4, P5, P6, P7, P8, and P9. The cluster center may correspond to a plurality of features. In the embodiment, the cluster center may correspond to a feature x1 and a feature x2. The feature x1 is, for example, the feature 1 shown in Table 2 (that is, the motherboard model), and the feature x2 is, for example, the feature 2 shown in Table 2 (that is, the central processing unit power). The initial feature value of each feature of the cluster center may be generated by the training module 122. For example, the training module 122 may randomly generate initial feature values of the cluster center.

Figure 5:
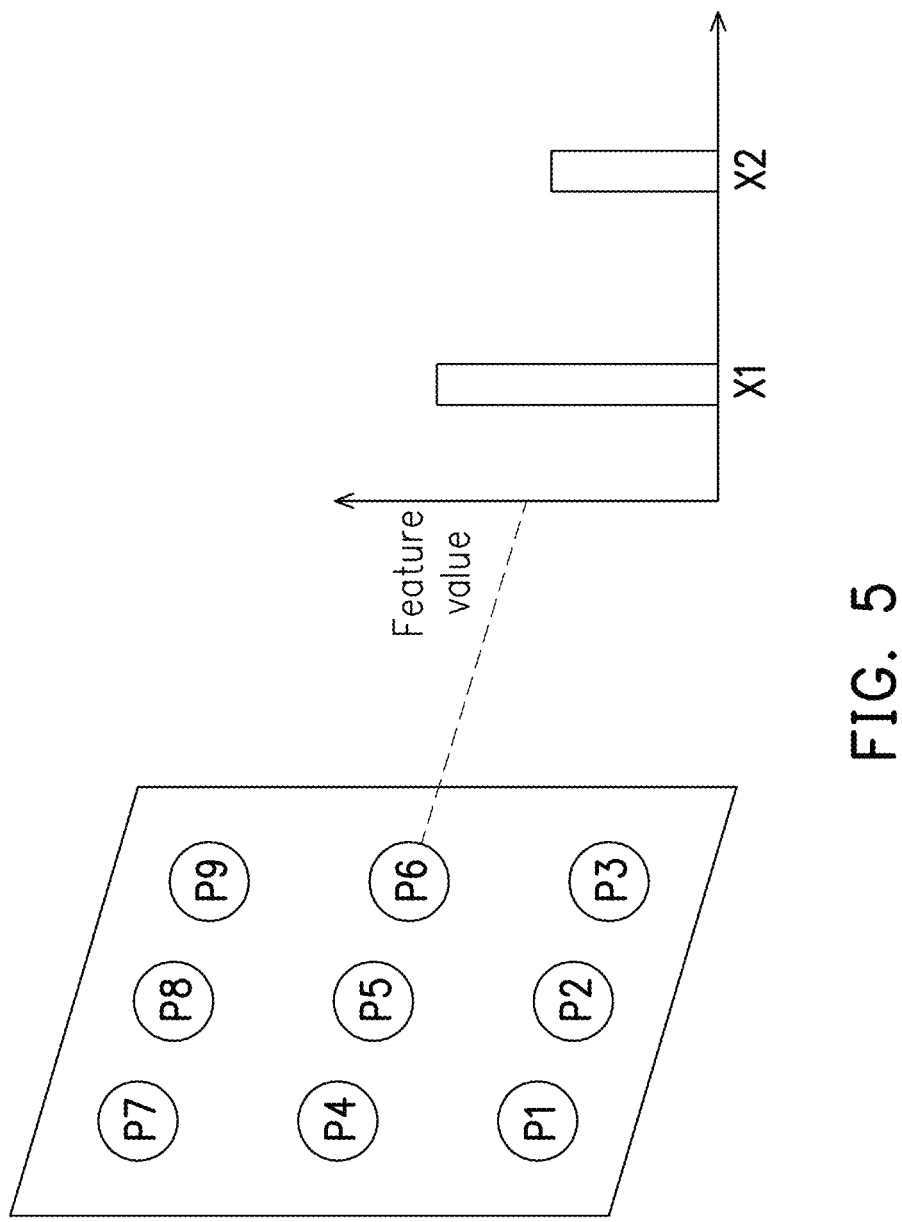
FIG. 5 shows a schematic diagram of the relationship between the cluster centers according to an embodiment of the disclosure.
Figure 6:
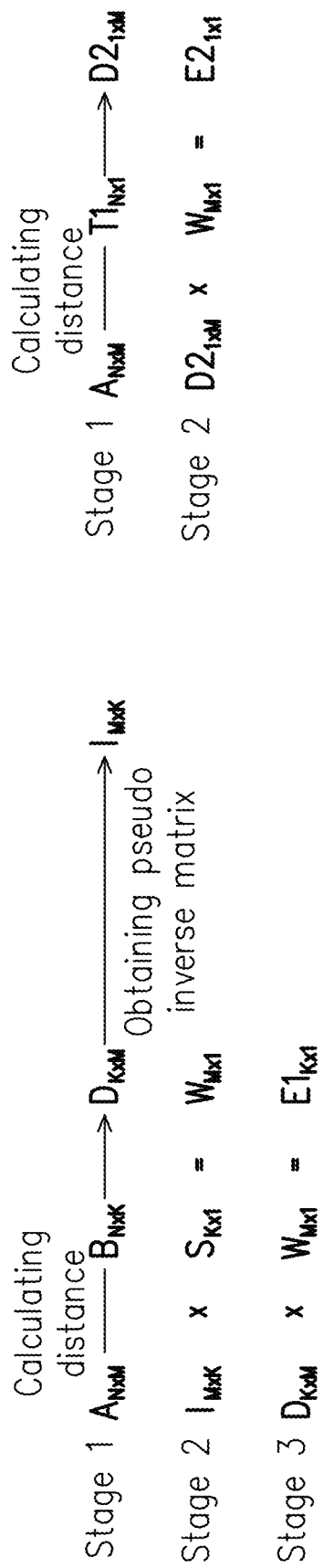
FIG. 6A shows a schematic diagram of generating a weight matrix according to an embodiment of the disclosure.
FIG. 6B shows a schematic diagram of using the weight matrix to generate scores corresponding to the test data according to an embodiment of the disclosure.

The first hidden layer 1201 may be configured to execute a self-organizing map (SOM) algorithm. First, the first hidden layer 1201 may define the relationship between the cluster centers of the neural network model 1000. FIG. 5 shows a schematic diagram of the relationship between the cluster centers according to an embodiment of the disclosure. In the embodiment, the first hidden layer 1201 may distribute the 9 cluster centers in a 3×3 grid, and define adjacent cluster centers as relevant cluster centers. For example, the first hidden layer 1201 may define that the cluster center P4 is relevant to the cluster centers P7, P5, and P1. The first hidden layer 1201 may define that the cluster center P3 is relevant to the cluster centers P2 and P6. The first hidden layer 1201 may define that the cluster center P5 is relevant to the cluster centers P2, P4, P6, and P8.

Then, the training module 122 may update the feature values of each cluster center according to the plurality pieces of label data. The training module 122 may classify the plurality pieces of label data into a training data set, a test data set, and a verification data set. The first hidden layer 1201 may update the feature values of each cluster center according to training data in the training data set. Specifically, the first hidden layer 1201 may determine that the training data corresponds to a specific cluster center according to the feature values of the training data, and update the feature values of the specific cluster center and the feature values of the cluster centers relevant to the specific cluster center according to the training data. As shown in FIG. 4A, assuming that the training module 122 inputs training data t1 into the neural network model 1000, the first hidden layer 1201 may determine (for example, based on the Euclidean distance) that the training data t1 corresponds to the cluster center P4. Accordingly, the first hidden layer 1201 may update the feature values of the cluster centers P4, P7, P5, and P1 according to the training data t1. The cluster centers updated with the training data t1 are shown in FIG. 4B.

Figure 4C:
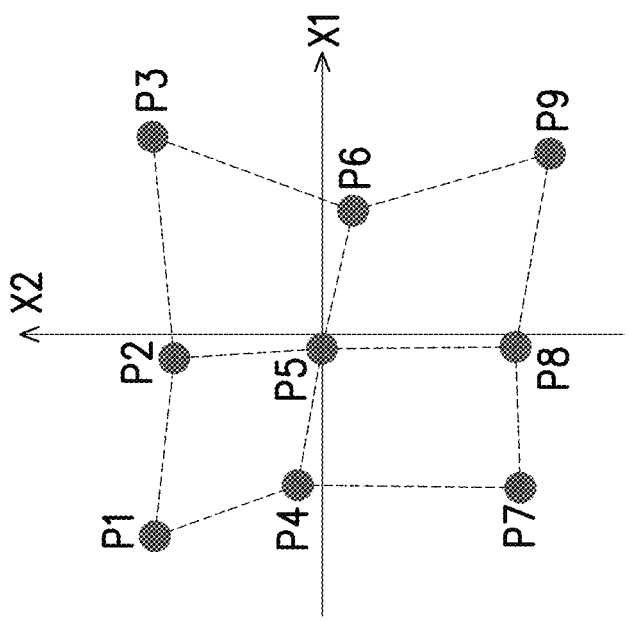

The first hidden layer 1201 may continuously update the feature values of the cluster centers according to a plurality pieces of training data in the training data set until a stop condition is satisfied. The stop condition is, for example, relevant to update times, convergence errors, or the like, and the embodiments of the disclosure are not limited thereto. The updated cluster centers may be as shown in FIG. 4C. After the update of the cluster centers is completed, the training of the first hidden layer 1201 may end.

During the training process of the first hidden layer 1201, the processor 110 may record the relationship between the training data and the cluster centers in the storage medium 120. For example, if the first hidden layer 1201 determines that the training data t1 corresponds to the cluster center P4, the processor 110 may record "the training data t1 corresponds to the cluster center P4" in the storage medium 120. In other words, after the feature values of each cluster center are updated, the storage medium 120 may record one or more pieces of training data corresponding to the specific cluster center.

In an embodiment, the computing module 123 may calculate the score of the specific cluster center according to the label scores in one or more pieces of training data corresponding to the specific cluster center. For example, if the storage medium 120 records that there are in total three pieces of training data—including the training data t1, training data t2, and training data t3—corresponding to the cluster center P4, then the computing module 123 may calculate the score corresponding to the cluster center P4 according to a label score s1 of the training data t1, a label score s2 of the training data t2, and a label score s3 of the training data t3. For example, the computing module 123 may calculate the average value of the label score s1, the label score s2, and the label score s3 as the score corresponding to the cluster center P4.

In an embodiment, the computing module 123 may count at least one label orientation of at least one piece of training data corresponding to a first cluster center among the plurality pieces of training data to determine an application orientation corresponding to the first cluster center. For example, if the storage medium 120 records that there are in total three pieces of data—including the training data t1, the training data t2, and the training data t3—corresponding to the cluster center P4, then the computing module 123 may determine the application orientation corresponding to the cluster center P4 according to a label orientation of o1 of the training data t1, a label orientation o2 of the training data t2, and a label orientation o3 of the training data t3. For example, the computing module 123 may count the number of label orientations corresponding to the high computing performance orientation among the label orientation o1, the label orientation o2, and the label orientation o3. If the number of label orientations corresponding to the high computing performance orientation is the majority, the computing module 123 may determine that the application orientation of the cluster center P4 is the high computing performance orientation.

After the update of the cluster centers is completed, the second hidden layer 1202 may generate a weight matrix according to the cluster centers based on a radial basis function (RBF) algorithm. FIG. 6A shows a schematic diagram of generating a weight matrix W according to an embodiment of the disclosure. It is supposed that N is the number of features, M is the number of cluster centers, and K is the number of the pieces of training data, where N, M, and K are positive integers. In stage 1, the second hidden layer 1202 may generate a matrix A and a matrix B, where an element $A_{i,j}(1 \leq i \leq N, 1 \leq j \leq M)$ of the matrix A represents the feature value of the i-th feature of the j-th cluster center, and an element $B_{i,j}(1 \leq i \leq N, 1 \leq j \leq K)$ of the matrix B represents the feature value of the i-th feature of the j-th piece of training data. The second hidden layer 1202 may calculate the distances (for example, the Euclidean distance) between K pieces of training data and M cluster centers according to the matrix A and the matrix B, thereby generating a distance matrix D, where an element $D_{i,j}(1 \leq i \leq K, 1 \leq j \leq M)$ of the distance matrix D represents the distance between the i-th piece of training data and the j-th cluster center. Then, the second hidden layer 1202 may generate a pseudo inverse matrix I of the distance matrix D.

In stage 2, the second hidden layer 1202 may generate a matrix S, where an element $S_{i,1}(1 \leq i \leq K)$ of the matrix S represents the label score of the i-th piece of training data. The training module 122 may multiply the pseudo inverse matrix I and the matrix S to generate the weight matrix W, where an element $W_{i,1}(1 \leq i \leq M)$ of the weight matrix W represents the weight corresponding to the i-th cluster center.

After the weight matrix W is obtained, the training of the second hidden layer 1202 may end. In an embodiment, the training module 122 may further determine whether the generated weight matrix W is usable. Specifically, in stage 3, the training module 122 may multiply the distance matrix D corresponding to the K pieces of training data by the weight matrix W to generate a matrix E1, where an element $E1_{i,1}(1 \leq i \leq K)$ of the matrix E1 represents the estimated score corresponding to the i-th piece of training data. The training module 122 may determine whether the weight matrix W is usable according to the matrix E1. For example, the training module 122 may determine that the weight matrix W is usable in response to the distance (for example, the Euclidean distance) between the matrix E1 and the matrix S being less than a threshold value. If the weight matrix W is usable, the training module 122 may determine that the training of the second hidden layer 1202 has been completed.

With reference back to FIG. 2A, in step S202, in addition to generating the neural network model 1000, the training module 122 may also generate the neural network models 2000, 3000, 4000, and 5000 in a similar manner to that of generating the neural network model 1000. The difference between different neural network models may be the number of cluster centers. For example, the neural network model 1000 may include 9 cluster centers, and the neural network model 2000 may include 1 cluster center. The number of cluster centers may be any positive integer, and the embodiments of the disclosure are not limited thereto. Table 3 is an example of the number of cluster centers corresponding to the neural network models 1000, 2000, 3000, 4000, and 5000.

TABLE 3

| Neural network model number | Number of cluster centers | Loss function value (Test data) |
| --- | --- | --- |
| Neural network model 1000 | 3 × 3 = 9 | 120 |
| Neural network model 2000 | 1 × 1 = 1 | 3800 |
| Neural network model 3000 | 2 × 2 = 4 | 1050 |
| Neural network model 4000 | 4 × 4 = 16 | 300 |
| Neural network model 5000 | 5 × 5 = 25 | 500 |

After the plurality of neural network models are generated, in step S203, the computing module 123 may analyze the performance of the plurality of neural network models. Taking the neural network model 1000 as an example, the computing module 123 may calculate the loss function value of the neural network model 1000 according to the test data set or the verification data set in the plurality pieces of label data, thereby determining the performance of the neural network model 1000 according to the loss function value. The loss function value is, for example, the root-mean-square error (RMSE) of the scores calculated by the neural network model 1000 and the label scores.

In order to calculate the loss function value of the neural network model 1000, the computing module 123 may input the data in the verification data set or the test data set to the neural network model 1000. Assuming that the computing module 123 inputs the test data to the neural network model 1000, the second hidden layer 1202 of the neural network model 1000 may use the weight matrix W to calculate the scores corresponding to the test data. FIG. 6B shows a schematic diagram of using the weight matrix W to generate scores corresponding to the test data according to an embodiment of the disclosure.

In stage 1, the second hidden layer 1202 may calculate the distance between the matrix A and a matrix T1 to generate a distance matrix D2, where the element $A_{i,j}(1 \leq i \leq N, 1 \leq j \leq M)$ of the matrix A represents the feature value of the i-th feature of the j-th cluster center, and the element $T1_{i,1}(1 \leq i \leq N)$ of the matrix T1 represents the feature value of the i-th feature of the test data, and the element $D2_{1,j}(1 \leq j \leq M)$ of the matrix D2 represents the distance between the test data and the j-th cluster center. After obtaining the distance matrix D2, in stage 2, the second hidden layer 1202 may multiply the distance matrix D2 and the weight matrix W to generate a score E2. The computing module 123 may calculate the loss function value of the neural network model 1000 according to the score E2. The loss function value is, for example, the root-mean-square error of the label scores of the test data and the score E2. As shown in Table 3, the computing module 123 may calculate the loss function value of the neural network model 1000 as 120. Based on a similar method, the computing module 123 may calculate the loss function values of the neural network models 2000, 3000, 4000, and 5000 as shown in Table 3.

Figure 7:
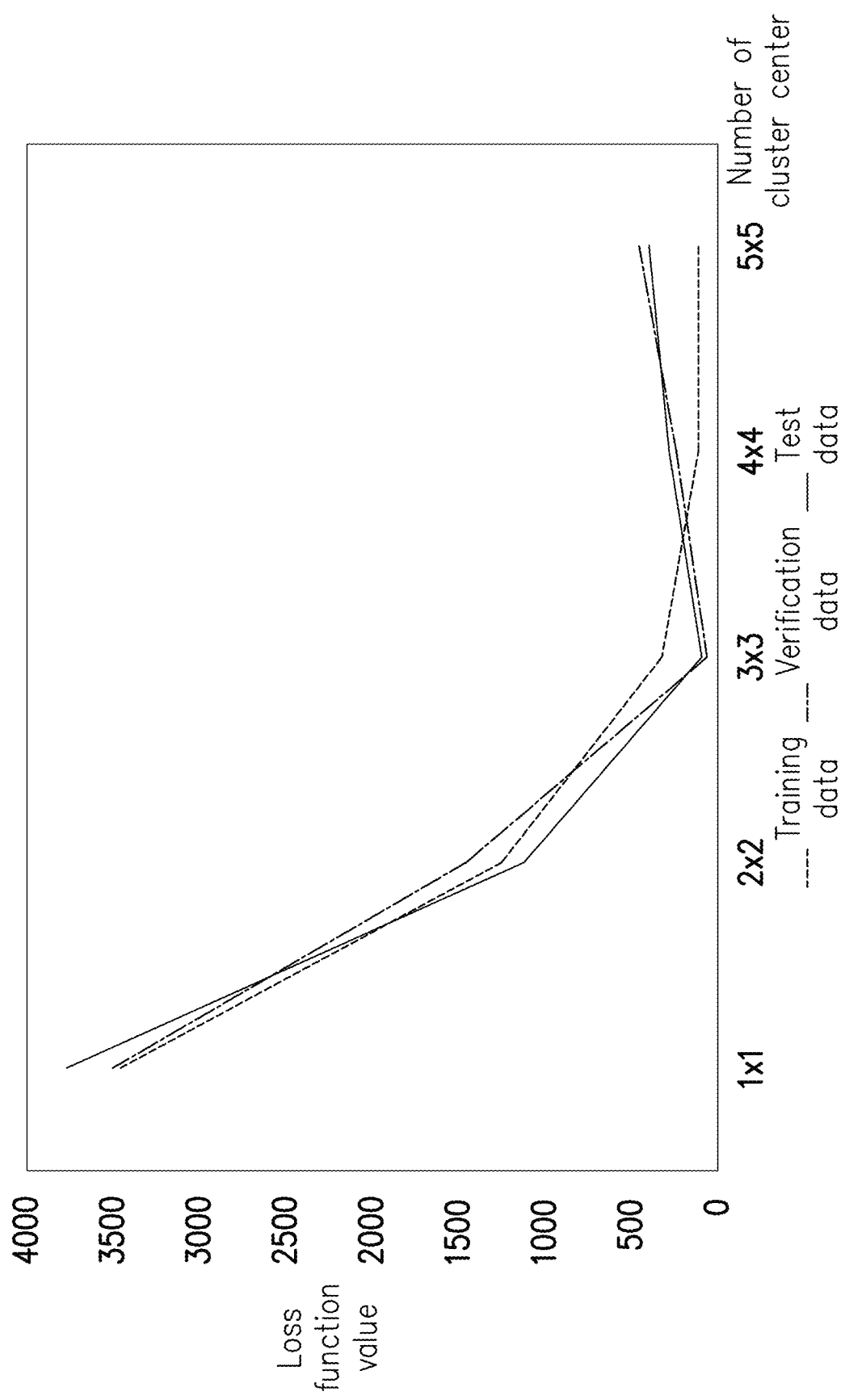
FIG. 7 shows a schematic diagram of the loss function values of the neural network models according to an embodiment of the disclosure.

With reference back to FIG. 2A, in step S204, the computing module 123 may select the best neural network model from the plurality of neural network models. For example, the computing module 123 may select the best neural network model according to the loss function value. FIG. 7 shows a schematic diagram of the loss function values of the neural network models according to an embodiment of the disclosure. It may be seen from FIG. 7 and Table 3 that compared with the neural network models including 1, 4, 16 and 25 cluster centers (that is, the neural network models 2000, 3000, 4000 and 5000), the neural network model including 9 cluster centers (that is, the neural network model 1000) has the lowest loss function value. Therefore, the computing module 123 may select the neural network model 1000 as the best neural network model.

Figure 2B:
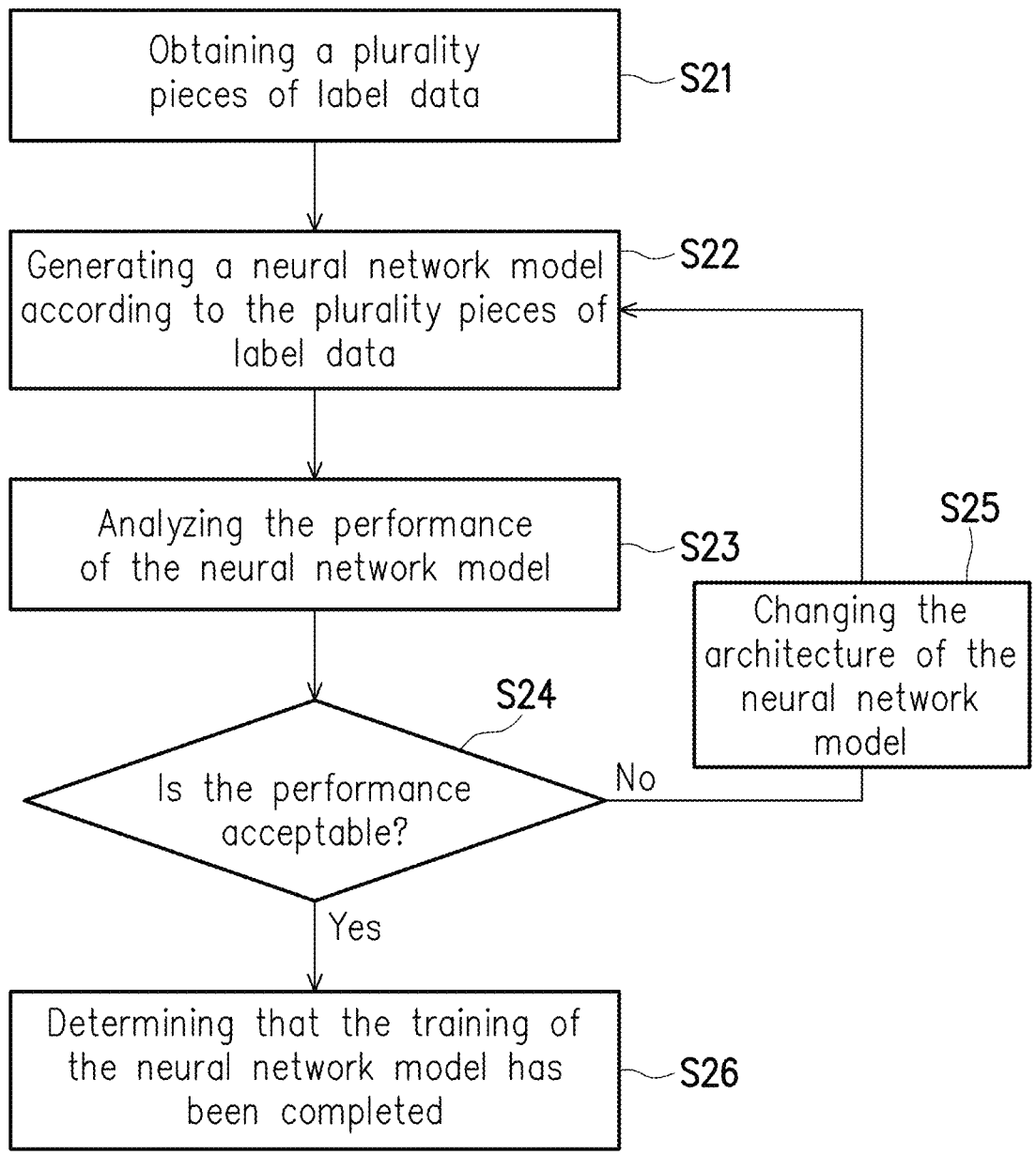
FIG. 2B shows a flowchart of generating the neural network model according to another embodiment of the disclosure.

FIG. 2B shows a flowchart of generating the neural network model 1000 according to another embodiment of the disclosure. In step S21, the data collection module 121 may obtain a plurality pieces of label data through the transceiver 130, and each of the plurality pieces of label data may include a label score and a plurality of label feature values respectively corresponding to the plurality of features. In step S22, the training module 122 may generate the neural network model 1000 according to the plurality pieces of label data. In step S23, the computing module 123 may analyze the performance of the neural network model 1000.

In step S24, the computing module 123 may determine whether the performance of the neural network model 1000 is acceptable. For example, the computing module 123 may determine that the performance of the neural network model 1000 is acceptable in response to the loss function value of the neural network model 1000 being less than a threshold value, and may determine that the performance of the neural network model 1000 is unacceptable in response to the loss function value being greater than or equal to the threshold value. If the performance of the neural network model 1000 is acceptable, the process proceeds to step S26. If the performance of the neural network model 1000 is unacceptable, the process proceeds to step S25.

In step S25, the training module 122 may change the architecture of the neural network model 1000, and return to step S22 to retrain the neural network model 1000. Specifically, the training module 122 may change the number of cluster centers of the neural network model 1000. For example, the training module 122 may change the number of cluster centers of the neural network model 1000 from 1 to 4. In step S26, the computing module 123 may determine that the training of the neural network model 1000 has been completed.

In an embodiment, the electronic device 100 may use the trained neural network model 1000 to calculate the scores of the configuration requirements. For example, the data collection module 121 may obtain the configuration requirements corresponding to a plurality of features (for example, the features shown in Table 2) through the transceiver 130. The computing module 123 may input the configuration requirements to the neural network model 1000, and the neural network model 1000 may output scores corresponding to the configuration requirements. Specifically, the second hidden layer 1202 of the neural network model 1000 may calculate the second distance matrix D2 corresponding to a plurality of cluster centers and configuration requirements according to the method shown in FIG. 6B, and calculate the scores of the configuration requirements according to the second distance matrix D2 and the weight matrix W. The output module 124 may output the scores through the transceiver 130 or through a coupled display device (not shown) for the user's reference. The user may evaluate the configuration requirements according to the scores.

In an embodiment, the data collection module 121 may obtain a plurality of configuration requirements including a first configuration requirement through the transceiver 130, and input the plurality of configuration requirements into the neural network model 1000 to generate a plurality of scores respectively corresponding to the plurality of configuration requirements. The computing module 123 may determine that the performance of the first configuration requirement is better than the performance of the other configuration requirements in response to a first score of the first configuration requirement being the largest score among the plurality of scores. For example, if the first score of the first configuration requirement is greater than a second score of a second configuration requirement, the user may determine that the performance of the first configuration requirement is better than the performance of the second configuration requirement. In an embodiment, the computing module 123 may determine that the performance of the second configuration requirement is worse than the performance of the other configuration requirements in response to the second score of the second configuration requirement being the smallest score among the plurality of scores. The computing module 123 may execute a difference analysis according to the first configuration requirement corresponding to the largest score and the second configuration requirement corresponding to the smallest score to generate a difference analysis report. The output module 124 may output the difference analysis report through the transceiver 130 for the user's reference. In this way, the user may determine which features (for example, the motherboard model, the central processing unit power, or the like) may significantly influence the performance according to the difference analysis report.

The electronic device 100 may use the trained neural network model 1000 to generate a reference configuration. If the user wants to design a computing device with a specific function, the user may collect historical data related to the specific function, and collect related configuration requirements through the historical data. The electronic device 100 may generate a reference configuration of the computing device according to the configuration requirements related to the historical data. For example, if the user wants to design a computing device with a high computing power, the electronic device 100 may generate a reference configuration using the configuration requirements corresponding to the high computing performance orientation. Similarly, if the user wants to design a computing device with a high storage capacity, the electronic device 100 may generate a reference configuration using the configuration requirements corresponding to the high storage capacity orientation.

In an embodiment, the data collection module 121 of the electronic device 100 may obtain a plurality of configuration requirements through the transceiver 130, and the plurality of configuration requirements respectively correspond to a plurality of features (for example, the features shown in Table 2). Then, the computing module 123 may input the plurality of configuration requirements into the neural network model 1000, respectively. The neural network model 1000 may generate a plurality of scores respectively corresponding to the plurality of configuration requirements. The computing module 123 may select the first configuration requirement from the plurality of configuration requirements according to the plurality of scores. For example, the computing module 123 may select the first configuration requirement from the plurality of configuration requirements in response to the first score of the first configuration requirement being the largest score among the plurality of scores.

In another embodiment, after the data collection module 121 obtains the first configuration requirement through the transceiver 130, the computing module 123 may determine that the first configuration requirement corresponds to one of the plurality of cluster centers in the neural network model 1000.

In an embodiment, the computing module 123 may determine which cluster center corresponds to the first configuration requirement according to the orientation of the first configuration requirement. Specifically, the first configuration requirement may include a first orientation. The computing module 123 may determine that the first configuration requirement corresponds to the first cluster center in response to the first orientation matching the application orientation of the first cluster center among the plurality of cluster centers. For example, if the first configuration requirement corresponds to the high computing performance orientation, and the first cluster center corresponds to the high computing performance orientation, then the computing module 123 may determine that the first configuration requirement corresponds to the first cluster center.

If there are a plurality of cluster centers corresponding to the same application orientation, and the application orientation matches the first orientation of the first configuration requirement, then the computing module 123 cannot directly determine the cluster center corresponding to the first configuration requirement according to the orientation. Accordingly, the computing module 123 may select a cluster center with the largest score from the plurality of cluster centers, and determine that the first configuration requirement corresponds to this cluster center. For example, suppose that among the plurality of cluster centers, the cluster center P4 and the cluster center P5 correspond to the high computing performance orientation. If the first configuration requirement also corresponds to the high computing performance orientation, then the computing module 123 may determine that the first configuration requirement corresponds to the cluster center P4 in response to the score of the cluster center P4 being greater than the score of the cluster center P5.

In an embodiment, the computing module 123 may determine that the first configuration requirement corresponds to the first cluster center in response to the first configuration requirement being closest to the first cluster center among the plurality of cluster centers (for example, according to the Euclidean distance). In an embodiment, the computing module 123 may determine which cluster center corresponds to the first configuration requirement according to distances between the first configuration requirement and the plurality of cluster centers. Specifically, the first configuration requirement may include a plurality of feature values respectively corresponding to a plurality of features, and each of the plurality of cluster centers may include a plurality of feature values respectively corresponding to the plurality of features. The computing module 123 may calculate a distance between the first configuration requirement and each of the plurality of cluster centers according to the plurality of feature values of the first configuration requirement and the plurality of feature values of each of the plurality of cluster centers, thereby generating a plurality of distances. The computing module 123 may determine that the first configuration requirement corresponds to the first cluster center in response to a first distance corresponding to the first cluster center being the smallest distance among the plurality of distances.

If there are a plurality of cluster centers closest to the first configuration requirement, the computing module 123 cannot directly determine the cluster center corresponding to the first configuration requirement according to the distances. Accordingly, the computing module 123 may select a cluster center with the largest score from the plurality of cluster centers, and determine that the first configuration requirement corresponds to this cluster center. For example, suppose that among the plurality of cluster centers, the cluster center P4 and the cluster center P5 are closest to the first configuration requirement. The computing module 123 may determine that the first configuration requirement corresponds to the cluster center P4 in response to the score of the cluster center P4 being greater than the score of the cluster center P5.

After determining the first cluster center corresponding to the first configuration requirement, the computing module 123 may generate a reference configuration according to the plurality of feature values of the first cluster center, and the plurality of feature values respectively correspond to the plurality of feature. For example, the computing module 123 may set the feature value of the feature "memory capacity" of the reference configuration to "16 megabytes" based on the feature value of the feature "memory capacity" of the first cluster center. After the reference configuration is generated, the output module 124 may output the reference configuration through the transceiver 130 for the user's reference.

In an embodiment, the data collection module 121 of the electronic device 100 may obtain a plurality of configuration requirements through the transceiver 130, and a plurality of device configurations may respectively correspond to a plurality of features (for example, the features shown in Table 2). Then, the computing module 123 may input the plurality of configuration requirements into the neural network model 1000, respectively. The neural network model 1000 may generate a plurality of scores respectively corresponding to the plurality of configuration requirements. The computing module 123 may select multiple configuration requirements from the plurality of configuration requirements according to the plurality of scores. For example, the computing module 123 may select the second configuration requirement and a third configuration requirement from the plurality of configuration requirements in response to the second score of the second configuration requirement and a third score of the third configuration requirement being greater than a score threshold value. Thereafter, the computing module 123 may determine which cluster centers correspond to the second configuration requirement and the third configuration requirement. For example, the computing module 123 may determine that the second configuration requirement corresponds to the second cluster center in response to the second configuration requirement being closest to the second cluster center among the plurality of cluster centers, and may determine that the third configuration requirement corresponds to the third cluster center in response to the third configuration requirement being closest to the third cluster center among the plurality of cluster centers. Accordingly, the computing module 123 may generate the reference configuration according to a plurality of feature values of the second cluster center and a plurality of feature values of the third cluster center, and the plurality of feature values correspond to the plurality of features. The feature value of each of the plurality of features of the cluster center is the most representative data in the cluster, so the computing module 123 may generate the reference configuration with the plurality of feature values of the cluster center.

Figure 8:
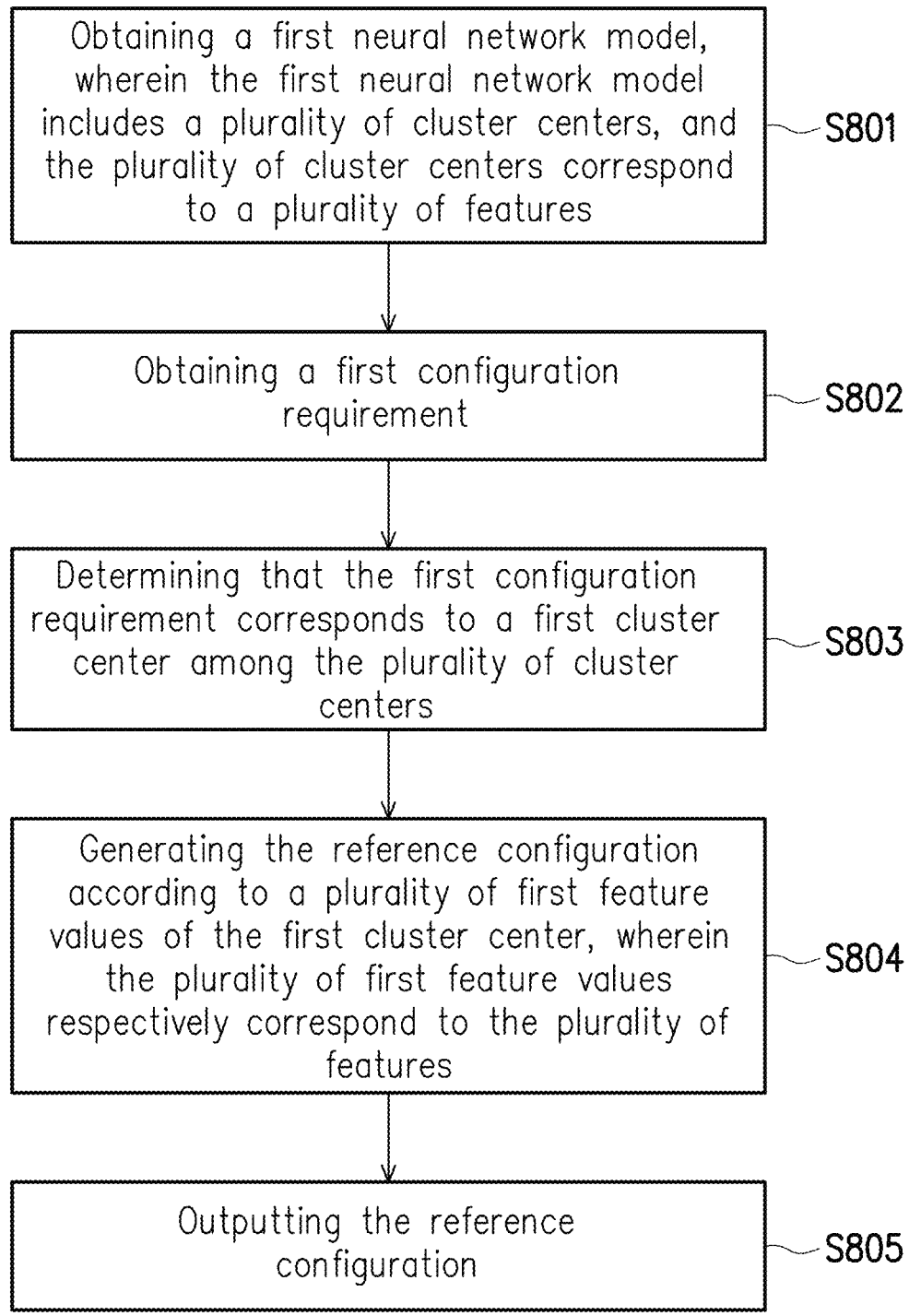
FIG. 8 shows a flowchart of a method for generating a reference configuration of a computing device according to an embodiment of the disclosure.

FIG. 8 shows a flowchart of a method for generating a reference configuration of a computing device according to an embodiment of the disclosure, and the method may be implemented by the electronic device 100 shown in FIG. 1. In step S801, a first neural network model is obtained, wherein the first neural network model includes a plurality of cluster centers, and the plurality of cluster centers correspond to a plurality of features. In step S802, a first configuration requirement is obtained. In step S803, it is determined that the first configuration requirement corresponds to a first cluster center among the plurality of cluster centers. In step S804, the reference configuration is generated according to a plurality of first feature values of the first cluster center, wherein the plurality of first feature values respectively correspond to the plurality of features. In step S805, the reference configuration is output.

In summary, the embodiments of the disclosure may train a neural network model for estimating a score of a device configuration based on historical data. Compared with conventional test software, the neural network model of the embodiments of the disclosure may calculate the score of the device configuration in a short time, and may save a lot of manpower or resources. The neural network model may include a plurality of cluster centers, and different cluster centers may represent device configurations that focus on different functions. The embodiments of the disclosure may determine the function corresponding to each cluster center through historical data and use the cluster centers to generate a reference configuration of a computing device focusing on a specific function according to the user requirements. In addition to serving as a reference when the user assembles the computing device, the reference configuration may also be analyzed by the user to help the user understand the influence of each component on the function of the computing device, thereby improving the user's ability to design the device configuration.

What is claimed is:

1. An electronic device for generating a reference configuration of a computing device, comprising:
    a storage medium which stores a plurality of modules and a first neural network model, wherein the first neural network model comprises a plurality of cluster centers, and the plurality of cluster centers correspond to a plurality of features; and
    a processor which is coupled to the storage medium and accesses and executes the plurality of modules, wherein the plurality of modules comprise:
    a data collection module configured to obtain a first configuration requirement, wherein the data collection module obtains a plurality pieces of label data, each of the plurality pieces of label data comprises a label score and a plurality of label feature values respectively corresponding to the plurality of features;
    a training module configured to generate the first neural network model according to the plurality pieces of label data;
    a computing module configured to execute:
        determining that the first configuration requirement corresponds to a first cluster center among the plurality of cluster centers; and
        generating the reference configuration according to a plurality of first feature values of the first cluster center, wherein the plurality of first feature values respectively correspond to the plurality of features; and
    an output module configured to output the reference configuration based on the trained first neural network model.

2. The electronic device according to claim 1, wherein the first configuration requirement comprises a first orientation, each of the plurality pieces of label data further comprises a label orientation, the computing module counts at least one label orientation of at least one piece of label data corresponding to the first cluster center among the plurality pieces of label data to determine a first application orientation corresponding to the first cluster center, and the computing module determines that the first configuration requirement corresponds to the first cluster center in response to the first orientation matching the first application orientation.

3. The electronic device according to claim 2, wherein the plurality of cluster centers further comprise a second cluster center,
    the computing module calculates a first score corresponding to the first cluster center and a second score corresponding to the second cluster center according to the plurality pieces of label data in response to both the first cluster center and the second cluster center corresponding to the first application orientation, and
    the computing module determines that the first configuration requirement corresponds to the first cluster center in response to the first orientation matching the first application orientation and the first score being greater than the second score.

4. The electronic device according to claim 1, wherein the plurality pieces of label data comprise first training data, the plurality of cluster centers further comprise a second cluster center and a third cluster center, the first neural network model comprises a first hidden layer, and the first hidden layer updates the plurality of cluster centers according to the plurality pieces of label data, comprising:
    defining that the third cluster center is relevant to the second cluster center;
    generating a plurality of second feature values of the second cluster center and a plurality of third feature values of the third cluster center; and
    determining that the first training data corresponds to the second cluster center, and updating the plurality of second feature values and the plurality of third feature values according to the first training data in response to the first training data corresponding to the second cluster center.

5. The electronic device according to claim 1, wherein the first configuration requirement comprises a plurality of feature values respectively corresponding to the plurality of features, and
    the computing module calculates a plurality of distances between the first configuration requirement and the plurality of cluster centers according to the plurality of feature values and determines that the first configuration requirement corresponds to the first cluster center in response to a first distance corresponding to the first cluster center being a smallest distance among the plurality of distances.

6. The electronic device according to claim 5, wherein the plurality of cluster centers further comprise a second cluster center, the plurality of distances further comprise a second distance corresponding to the second cluster center,
    the computing module calculates a first score corresponding to the first cluster center and a second score corresponding to the second cluster center according to a plurality pieces of second label data respectively corresponding to the first cluster center and the second cluster center in response to the first distance being equal to the second distance, and the computing module determines that the first configuration requirement corresponds to the first cluster center in response to the first score being greater than the second score.

7. The electronic device according to claim 1, wherein the plurality pieces of label data comprise a plurality pieces of training data respectively corresponding to a plurality of label scores, the first neural network model comprises a second hidden layer, and the second hidden layer is configured to execute:

generating a distance matrix corresponding to the plurality of cluster centers and the plurality pieces of training data;

generating a pseudo inverse matrix of the distance matrix;

generating a weight matrix according to the pseudo inverse matrix and the plurality of label scores;

generating a second distance matrix corresponding to the plurality of cluster centers and the first configuration requirement; and generating a first score corresponding to the first configuration requirement according to the second distance matrix and the weight matrix, wherein the output module outputs the first score.

8. The electronic device according to claim 7, wherein the data collection module obtains a plurality of configuration requirements, wherein the plurality of configuration requirements comprise the first configuration requirement and a second configuration requirement, the computing module inputs the plurality of configuration requirements into the first neural network model to generate a plurality of scores respectively corresponding to the plurality of configuration requirements, the computing module selects the first configuration requirement to generate the reference configuration in response to the first score being a largest score among the plurality of scores, the computing module generates a difference analysis report according to the first configuration requirement and the second configuration requirement in response to the first score being the largest score and a second score corresponding to the second configuration requirement being a smallest score among the plurality of scores, and the output module outputs the difference analysis report.

9. The electronic device according to claim 1, wherein the plurality pieces of label data comprise a plurality pieces of training data and a plurality pieces of test data, the training module generates the first neural network model and a second neural network model according to the plurality pieces of training data, wherein the second neural network model comprises a plurality of second cluster centers, and a first number of the plurality of cluster centers is different from a second number of the plurality of second cluster centers, the computing module calculates a first loss function value of the first neural network model and a second loss function value of the second neural network model according to the plurality pieces of test data, and the computing module selects the first neural network model from the first neural network model and the second neural network model to generate the reference configuration in response to the first loss function value being less than the second loss function value.

10. A method for generating a reference configuration of a computing device, comprising:

obtaining a first neural network model, comprising:
obtaining a plurality pieces of label data, wherein each of the plurality pieces of label data comprises a label score and a plurality of label feature values respectively corresponding to a plurality of features; and generating the first neural network model according to the plurality pieces of label data, wherein the first neural network model comprises a plurality of cluster centers, and the plurality of cluster centers correspond to the plurality of features;

obtaining a first configuration requirement;

determining that the first configuration requirement corresponds to a first cluster center among the plurality of cluster centers;

generating the reference configuration according to a plurality of first feature values of the first cluster center, wherein the plurality of first feature values respectively correspond to the plurality of features; and outputting the reference configuration based on the trained first neural network model.

11. The method according to claim 10, wherein the first configuration requirement comprises a first orientation, each of the plurality pieces of label data further comprises a label orientation, and determining that the first configuration requirement corresponds to the first cluster center among the plurality of cluster centers comprises:

counting at least one label orientation of at least one piece of label data corresponding to the first cluster center among the plurality pieces of label data to determine a first application orientation corresponding to the first cluster center; and determining that the first configuration requirement corresponds to the first cluster center in response to the first orientation matching the first application orientation.

12. The method according to claim 11, wherein the plurality of cluster centers further comprise a second cluster center, and determining that the first configuration requirement corresponds to the first cluster center among the plurality of cluster centers comprises:

calculating a first score corresponding to the first cluster center and a second score corresponding to the second cluster center according to the plurality pieces of label data in response to both the first cluster center and the second cluster center corresponding to the first application orientation; and determining that the first configuration requirement corresponds to the first cluster center in response to the first orientation matching the first application orientation and the first score being greater than the second score.

13. The method according to claim 10, wherein the plurality pieces of label data comprise first training data, the plurality of cluster centers further comprise a second cluster center and a third cluster center, the first neural network model comprises a first hidden layer, and the first hidden layer updates the plurality of cluster centers according to the plurality pieces of label data, comprising:

defining that the third cluster center is relevant to the second cluster center;

generating a plurality of second feature values of the second cluster center and a plurality of third feature values of the third cluster center; and determining that the first training data corresponds to the second cluster center, and updating the plurality of second feature values and the plurality of third feature values according to the first training data in response to the first training data corresponding to the second cluster center.

14. The method according to claim 10, wherein the first configuration requirement comprises a plurality of feature values respectively corresponding to the plurality of features, and determining that the first configuration requirement corresponds to the first cluster center among the plurality of cluster centers comprises:
calculating a plurality of distances between the first configuration requirement and the plurality of cluster centers according to the plurality of feature values; and
determining that the first configuration requirement corresponds to the first cluster center in response to a first distance corresponding to the first cluster center being a smallest distance among the plurality of distances.

15. The method according to claim 14, wherein the plurality of cluster centers further comprise a second cluster center, the plurality of distances further comprise a second distance corresponding to the second cluster center, and determining that the first configuration requirement corresponds to the first cluster center among the plurality of cluster centers further comprises:
calculating a first score corresponding to the first cluster center and a second score corresponding to the second cluster center according to a plurality pieces of second label data respectively corresponding to the first cluster center and the second cluster center in response to the first distance being equal to the second distance; and
determining that the first configuration requirement corresponds to the first cluster center in response to the first score being greater than the second score.

16. The method according to claim 10, wherein the plurality pieces of label data comprise a plurality pieces of training data respectively corresponding to a plurality of label scores, the first neural network model comprises a second hidden layer, and the second hidden layer is configured to execute:
generating a distance matrix corresponding to the plurality of cluster centers and the plurality pieces of training data;
generating a pseudo inverse matrix of the distance matrix;
generating a weight matrix according to the pseudo inverse matrix and the plurality of label scores;
generating a second distance matrix corresponding to the plurality of cluster centers and the first configuration requirement; and
generating a first score corresponding to the first configuration requirement according to the second distance matrix and the weight matrix,
wherein the method further comprises:
outputting the first score.

17. The method according to claim 16, wherein generating the reference configuration according to the plurality of first feature values of the first cluster center comprises:
obtaining a plurality of configuration requirements, wherein the plurality of configuration requirements comprise the first configuration requirement and a second configuration requirement;
inputting the plurality of configuration requirements into the first neural network model to generate a plurality of scores respectively corresponding to the plurality of configuration requirements;
selecting the first configuration requirement to generate the reference configuration in response to the first score being a largest score among the plurality of scores; and
generating a difference analysis report according to the first configuration requirement and the second configuration requirement in response to the first score being the largest score and a second score corresponding to the second configuration requirement being a smallest score among the plurality of scores, and outputting the difference analysis report.

18. The method according to claim 10, wherein the plurality pieces of label data comprise a plurality pieces of training data and a plurality pieces of test data, and generating the reference configuration according to the plurality of first feature values of the first cluster center comprises:
generating the first neural network model and a second neural network model according to the plurality pieces of training data, wherein the second neural network model comprises a plurality of second cluster centers, and a first number of the plurality of cluster centers is different from a second number of the plurality of second cluster centers;
calculating a first loss function value of the first neural network model and a second loss function value of the second neural network model according to the plurality pieces of test data; and
selecting the first neural network model from the first neural network model and the second neural network model to generate the reference configuration in response to the first loss function value being less than the second loss function value.

* * * * *